United States Patent [19]
Budde et al.

[11] Patent Number: 5,812,343
[45] Date of Patent: Sep. 22, 1998

[54] BASE PLATE WITH IMPROVED SWAGE PERFORMANCE AND REDUCED MASS

[75] Inventors: Richard A. Budde, Plymouth; Cal E. Hardie, Edina, both of Minn.

[73] Assignee: Seagate Technology, Inc., Scotts Valley, Calif.

[21] Appl. No.: 818,929

[22] Filed: Mar. 17, 1997

[51] Int. Cl.$^6$ .............................. G11B 5/48; G11B 21/16
[52] U.S. Cl. ............................................................ 360/104
[58] Field of Search ............................ 360/97.01, 103, 360/104, 105, 106

[56] References Cited

U.S. PATENT DOCUMENTS

| | | | |
|---|---|---|---|
| 5,187,626 | 2/1993 | Hopkins et al. | 360/104 |
| 5,191,705 | 3/1993 | Toensing | 29/764 |
| 5,347,413 | 9/1994 | Hanke et al. | 360/104 |
| 5,469,604 | 11/1995 | Calmettes et al. | 24/20 |
| 5,471,735 | 12/1995 | Hanke et al. | 29/603 |
| 5,497,282 | 3/1996 | Hoffmann et al. | 360/104 |
| 5,553,374 | 9/1996 | Hanks et al. | 29/272 |
| 5,570,249 | 10/1996 | Aoyagi et al. | 360/104 |
| 5,570,261 | 10/1996 | Frater et al. | 360/104 |
| 5,579,190 | 11/1996 | Mastache et al. | 360/106 |
| 5,602,698 | 2/1997 | Miyazaki et al. | 360/104 |

*Primary Examiner*—Stuart S. Levy
*Assistant Examiner*—William J. Klimowicz
*Attorney, Agent, or Firm*—Westman, Champlin & Kelly, P.A.

[57] ABSTRACT

A base plate is disclosed for swage or ball stake mounting a transducer carrying arm to a support arm. The base plate includes a flange and a tubular member or boss. The flange has a non-rectangular profile and first, second, third and fourth arms extending generally in first, second, third and fourth directions. Each of the arms of the flange defines a separate corner of a rectangular profile so that rectangular profile compatible equipment can be used with the base plate of the present invention. The non-rectangular profile of the flange fits within the defined rectangular profile such that the mass of the flange is reduced to thereby improve resonance, shock and access time performance of the disc drive.

14 Claims, 3 Drawing Sheets

BASE PLATE WITH IMPROVED SWAGE PERFORMANCE AND REDUCED MASS

BACKGROUND OF THE INVENTION

The present application claims the benefit of earlier filed U.S. Provisional Application No. 60/035,012, entitled "A BASE PLATE WITH IMPROVED SWAGE PERFORMANCE AND REDUCED MASS", filed on Jan. 15, 1997.

The present invention relates generally to disc drive head gimbal assemblies. More particularly, the present invention relates to an improved swage mount base plate for connecting a transducer carrying arm to a support arm in a disc drive data storage system.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective head gimbal assemblies (HGAs) The HGAs carry transducers which write information to, and read information from, the disc surfaces. An actuator mechanism moves the HGAs from track to track across surfaces of the discs under control of electronic circuitry. The actuator mechanism includes a track accessing support arm and a transducer carrying arm for each head gimbal assembly. Using terms common to the industry, the track accessing support arm is commonly referred to as an "E-block" arm, and the transducer carrying arm is typically referred to as a "load beam".

Typically, each load beam is connected to its corresponding E-block support arm using a swage or ball stake connection. In order to swage mount the load beam to the support arm, a swage base plate having a flange and a boss is used. The flange lays flat against one of the support arms and the load beam, and can be laser welded to the support arm or load beam. The boss of the base plate is typically inserted through an aperture in one or both of the support arm and the load beam. Subsequently, the boss is deformed slightly by forcing a ball through a center portion of the boss to form a swage connection between the support arm and the load beam.

Conventional base plate designs have tended to utilize a square or rectangular shaped flange. Consequently, a good portion of the machinery used in the industry to aid in assembling baseplates to loadbeams is designed to work with square or a rectangular base plates. Such machines include bowl feeders, welders, and other automated assembly equipment. One disadvantage of conventional square or rectangular shaped base plate flanges is that they introduce a significant quantity of mass to the HGAs. The mass and associated inertia of the base plate contributes negatively to undesirable resonance and shock performance, as well as to increased access time performance of the disc drive. A second disadvantage of current base plate flange designs is that the swaging process undesirably transfers some of the base plate deformation to the suspension or load beam. Frequently, this changes the pre-load force which the load beam has been designed to apply to the HGA.

SUMMARY OF THE INVENTION

A base plate is disclosed for swage or ball stake mounting a transducer carrying arm to a support arm in a disc drive. The base plate includes a flange and a tubular member or boss. The flange has a non-rectangular profile and first, second, third and fourth arms extending generally in first, second, third and fourth directions. Each of the arms of the flange defines a separate corner of a rectangular profile such that rectangular profile compatible equipment can be used with the base plate of the present invention. The non-rectangular profile of the flange fits within the defined rectangular profile such that the mass of the flange is reduced to thereby improve resonance, shock and access time performance of the disc drive.

DETAILED DESCRIPTION OF THE PREFERRED EMBODIMENTS

Figure 1A:
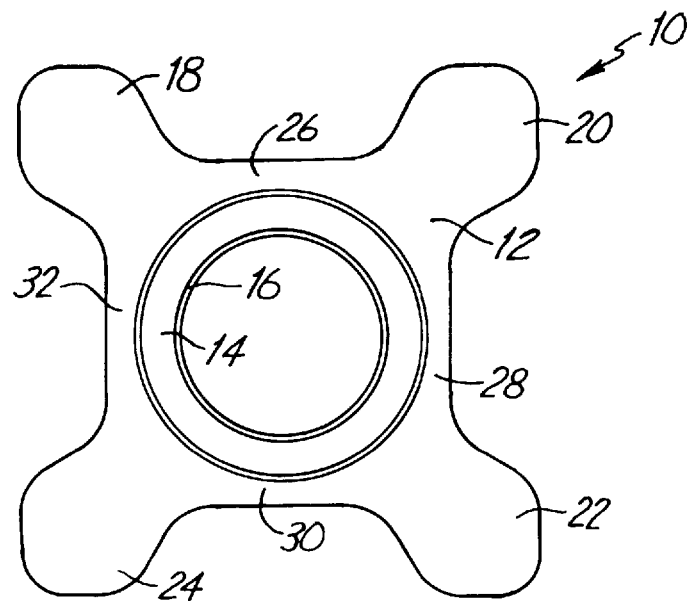
FIGS. 1A and 1B are top and side views, with portions shown in section, of a swage base plate in accordance with preferred embodiments of the present invention.
Figure 1B:
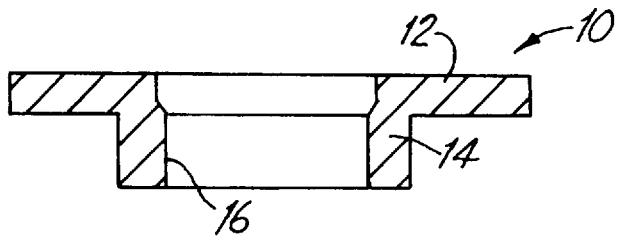

FIGS. 1A and 1B are top and side views, respectively, of base plate 10 in accordance with the preferred embodiments of the present invention. Base plate 10 includes flange 12 and tubular member or "boss" 14. Boss 14 is adapted for insertion into boss receiving apertures in one or both of a support arm and a transducer carrying arm (not shown in FIGS. 1A and 1B). Boss 14 includes aperture 16 extending therethrough for receiving a ball as part of a swage or ball stake mount process as is known in the art. Flange 12 includes four arms or corner extensions 18, 20, 22 and 24. Between each arm, flange 12 includes a respective one of side regions 26, 28, 30 and 32.

Figure 2:
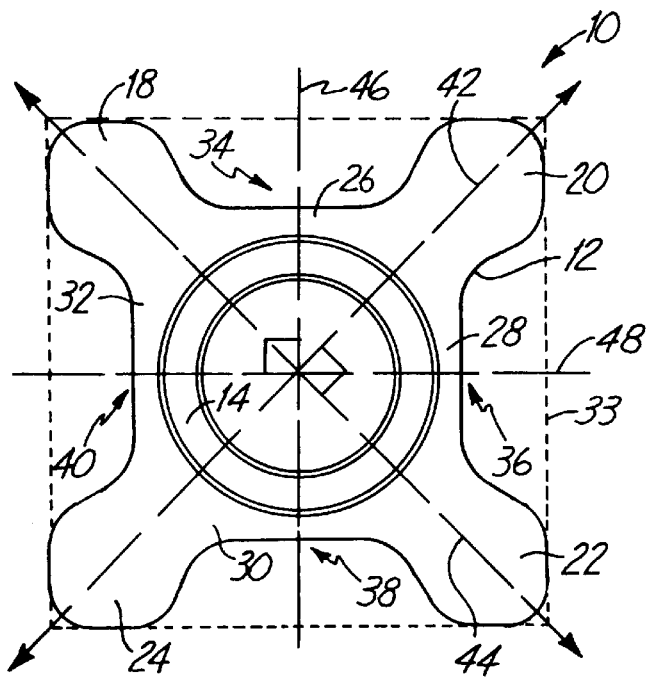
FIG. 2 is a diagrammatic top view of the swage base plate of the present invention which further illustrates the non-rectangular profile of the flange.
Figure 4:
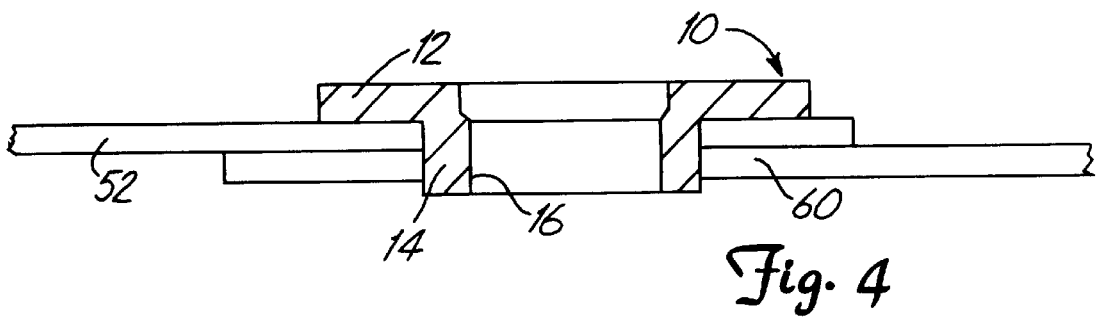
FIG. 4 is a side diagrammatic view, with portions shown in section, of a swage connection between a support arm and a transducer carrying arm which utilizes the base plate of the present invention.

As best illustrated in FIG. 2, arms 18, 20, 22 and 24 of flange 12 each extend substantially to a different corner of rectangular profile 33. Thus, arms 18, 20, 22 and 24 define rectangular profile 33. In preferred embodiments, rectangular profile 33 is a square profile.

Since side regions 26, 28, 30 and 32 extend only a fraction of the distance between boss 14 and the respective sides of rectangular profile 33, flange 12 will have a significantly reduced mass as compared to a flange of the same thickness having rectangular profile 33. Thus, by forming valley regions 34, 36, 38 and 40 in which flange 12 does not extend to the corresponding sides of rectangular profile 33 (i.e., flange 12 has a non-rectangular profile or shape), the resulting reduction in mass will provide improvements in the resonance, shock and access time performance of the disc drive. Since arms 18, 20, 22 and 24 extend into the corner regions of rectangular profile 33 providing a compatible location for welding and handling, existing rectangular (typically square) profile compatible machinery need not be replaced. In preferred embodiments, flange 12 of base plate 10 is symmetric about each of orthogonal axes 46 and 48. In embodiments in which rectangular profile is a square profile, flange 12 is also preferably symmetric about each of axes 42 and 44. In this instance, axis 42 is defined by two antiparallel directions corresponding to the directions in which arms 20 and 24 generally extend. Axis 44 is defined by the two antiparallel directions in which arms 18 and 22 generally extend.

Figure 3:
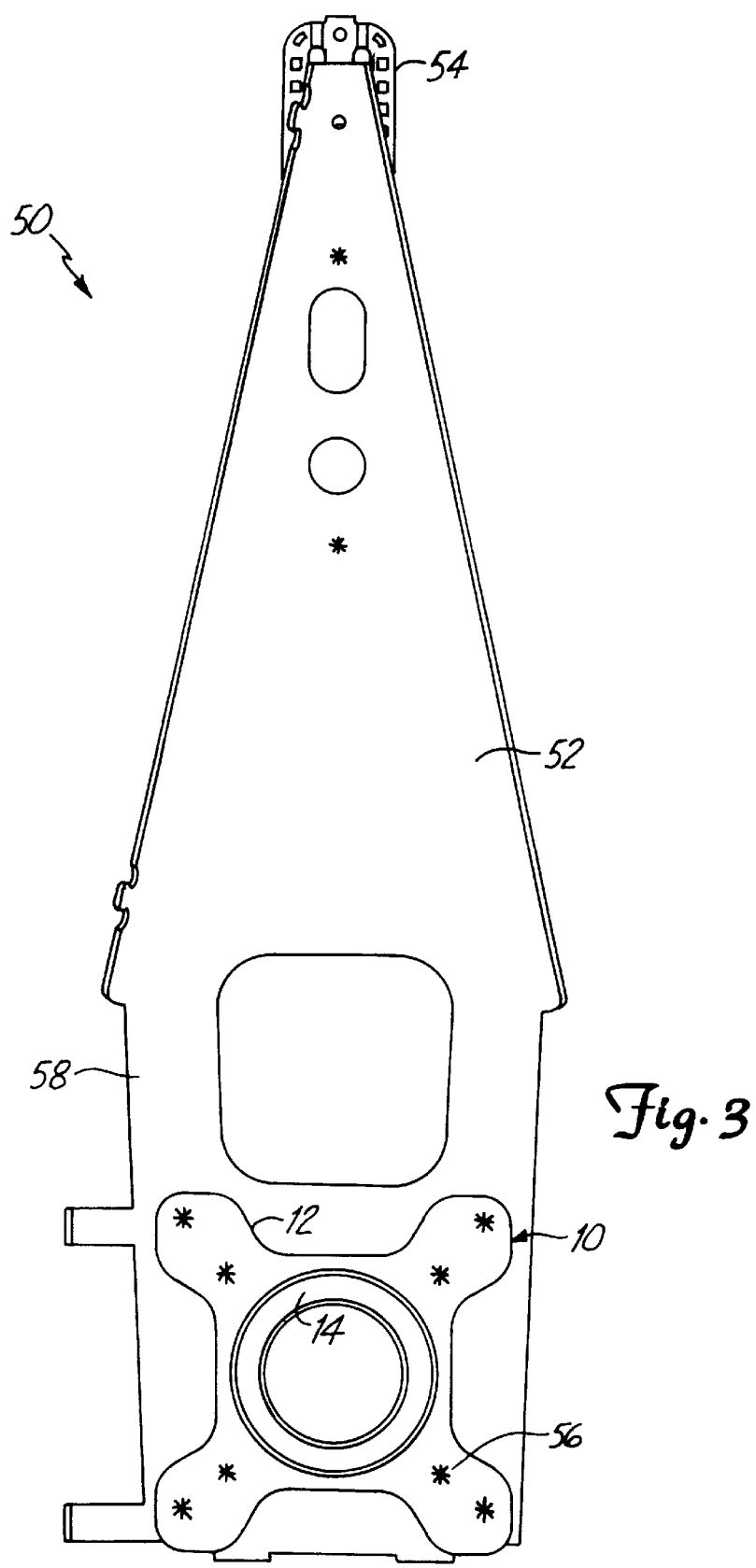
FIG. 3 is a top view of a HGA using the swage base plate of the present invention.

FIG. 3 is a top and side diagrammatic views of HGA 50 using base plate 10 of the present invention. HGA 50 includes load beam or transducer carrying arm 52 and flexure or gimbal 54. Transducer carrying arm 52 includes pre-load bend region 58 which establishes a designed pre-load force on the head mounted on gimbal 54. As illustrated, base plate 10 can be attached to transducer carrying arm 52 using laser welds 56. Separate from laser welds 56, base plate 10 is connected to support arm 60 using conventional swage or ball stake mounting processes.

It is believed that the design of flange 12 minimizes the change to the pre-load force of the support arm 52 during swaging. The trimmed down center portions of flange 12 (i.e., side regions 26, 28, 30 and 32 labelled in FIGS. 1A and 2) should deform and absorb the energy of swaging. Corner extensions or arms 18, 20, 22 and 24, which define the boundary conditions of the swage connection to the transducer carrying arm, should remain flat and not effect the pre-load force established by the preload bend region 58. This represents a significant improvement over conventional base plate designs in which the swaging process can change the pre-load force by 10% or more.

Although the present invention has been described with reference to preferred embodiments, workers skilled in the art will recognize that changes may be made in form and detail without departing from the spirit and scope of the invention.

What is claimed is:

1. A base plate for mounting a transducer carrying arm to a support arm, the base plate comprising:
   a flange having a non-rectangular shape, the flange comprising:
      a first arm extending generally in a first direction;
      a second arm extending generally in a second direction;
      a third arm extending generally in a third direction; and
      a fourth arm extending generally in a fourth direction, wherein each of the first, second, third and fourth arms of the flange defines a separate corner of a square profile, wherein the non-rectangular shape of the flange fits entirely within the square profile;
   a tubular member connected to the flange and adapted to extend in a fifth direction through a tubular member receiving hole in at least one of the transducer carrying arm and the support arm to form a ball stake mount which secures the transducer carrying arm to the support arm.

2. The base plate of claim 1, wherein the flange further comprises:
   a first side region extending between the first and second arms toward a first side of the square profile;
   a second side region extending between the second and third arms toward a second side of the square profile;
   a third side region extending between the third and fourth arms toward a third side of the square profile; and
   a fourth side region extending between the fourth and first arms toward a fourth side of the square profile.

3. The base plate of claim 2, wherein each of the first, second, third and fourth side regions of the flange extends toward the corresponding side of the square profile a fraction of a distance between the tubular member and the corresponding side of the square profile.

4. The base plate of claim 1, wherein the first direction is substantially antiparallel to the third direction, and wherein the second direction is substantially antiparallel to the fourth direction.

5. The base plate of claim 4, wherein the first and third directions define a first axis and the second and fourth directions define a second axis, wherein the flange is symmetric about both of the first and second axes.

6. The base plate of claim 5, wherein the fifth direction is substantially perpendicular to each of the first, second, third and fourth directions.

7. A magnetic transducer support comprising:
   a transducer carrying arm;
   a support arm; and
   a base plate for swage connecting the transducer carrying arm to the support arm, the base plate comprising:
      a flange having a non-rectangular flange profile, the flange comprising a first corner extension extending generally in a first direction, a second corner extension extending generally in a second direction, a third corner extension extending generally in a third direction, and a fourth corner extension extending generally in a fourth direction, wherein each of the corner extensions defines a separate corner of a rectangular profile, wherein the non-rectangular flange profile is located within the rectangular profile; and
      a boss connected to the flange and adapted to extend generally in a fifth direction through a boss receiving aperture in at least one of the transducer carrying arm and the support arm to thereby secure the transducer carrying arm to the support arm.

8. The magnetic transducer support of claim 7, wherein the flange further comprises:
   a first side region extending between the first and second corner extensions toward a first side of the rectangular profile;
   a second side region extending between the second and third corner extensions toward a second side of the rectangular profile;
   a third side region extending between the third and fourth corner extensions toward a third side of the rectangular profile; and
   a fourth side region extending between the fourth and first corner extensions toward a fourth side of the rectangular profile.

9. The magnetic transducer support of claim 8, wherein each of the first, second, third and fourth side regions of the flange extends toward the corresponding side of the rectangular profile a fraction of a total distance between the boss and the corresponding side of the rectangular profile.

10. The magnetic transducer support of claim 9, wherein the rectangular profile defined by the corner extensions of the flange is a square profile.

11. The magnetic transducer support of claim 10, wherein the first and third directions define a first axis and the second and fourth directions define a second axis, wherein the flange is symmetric about both of the first and second axes.

12. The magnetic transducer support of claim 11, wherein the fifth direction is substantially perpendicular to each of the first, second, third and fourth directions.

13. A magnetic transducer support comprising:
   a transducer carrying arm;
   a support arm; and
   a base plate for swage connecting the transducer carrying arm to the support arm, the base plate comprising:
      a flange having a non-rectangular flange profile, the flange comprising a first arm extending generally in a first direction, a second arm extending generally in a second direction orthogonal to the first direction, a third arm extending generally in a third direction antiparallel to the first direction, and a fourth arm extending generally in a fourth direction antiparallel to the second direction, wherein each of the arms defines a separate corner of a square profile, wherein the non-rectangular flange profile fits entirely within the square profile; and a tubular member connected to the flange and adapted to extend generally in a fifth direction through a tubular member receiving aperture in at least one of the transducer carrying arm and the support arm to thereby secure the transducer carrying arm to the support arm.

14. The magnetic transducer support of claim 13, wherein the first and third directions define a first axis and the second and fourth directions define a second axis, wherein the flange is symmetric about both of the first and second axes.

* * * * *